US010048741B1

(12) United States Patent
Shahneous Bari et al.

(10) Patent No.: US 10,048,741 B1
(45) Date of Patent: Aug. 14, 2018

(54) BANDWIDTH-AWARE MULTI-FREQUENCY PERFORMANCE ESTIMATION MECHANISM

(71) Applicant: Advanced Micro Devices, Inc., Sunnyvale, CA (US)

(72) Inventors: Md Abdullah Shahneous Bari, Richmond Hill, NY (US); Leonardo Piga, Austin, TX (US); Indrani Paul, Round Rock, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 24 days.

(21) Appl. No.: 15/416,993

(22) Filed: Jan. 26, 2017

(51) Int. Cl.
*G06F 12/00* (2006.01)
*G06F 1/32* (2006.01)
*G06F 3/06* (2006.01)

(52) U.S. Cl.
CPC ............ *G06F 1/324* (2013.01); *G06F 3/0604* (2013.01); *G06F 3/0611* (2013.01); *G06F 3/0625* (2013.01); *G06F 3/0629* (2013.01); *G06F 3/0673* (2013.01)

(58) Field of Classification Search
CPC ...... G06F 1/324; G06F 3/0604; G06F 3/0611; G06F 3/0613; G06F 3/0625; G06F 3/0629; G06F 3/0673
See application file for complete search history.

(56) References Cited

U.S. PATENT DOCUMENTS

2017/0038816 A1* 2/2017 Madsen ................ G06F 1/3206

OTHER PUBLICATIONS

Su et al., "Implementing a Leading Loads Performance Predictor on Commodity Processors", Proceedings of USENIX ATC '14: 2014 USENIX Annual Technical Conference, Jun. 19-20, 2014, pp. 205-210, USENIX Association, Berkeley, CA, USA, https://www.usenix.org/system/files/conference/atc14/atc14-paper-su.pdf. [Retrieved Dec. 1, 2016].

(Continued)

*Primary Examiner* — Shawn X Gu
(74) *Attorney, Agent, or Firm* — Rory D. Rankin; Meyertons, Hood, Kivlin, Kowert & Goetzel, P.C.

(57) ABSTRACT

Systems, apparatuses, and methods for implementing performance estimation mechanisms are disclosed. In one embodiment, a computing system includes at least one processor and a memory subsystem. During a characterization phase, the system utilizes a memory intensive workload to detect when the memory subsystem reaches its saturation point. Then, the system collects performance counter values during a sampling phase of a target application to determine the memory bandwidth. If the memory bandwidth is greater than the saturation point, then the system generates a prediction of the memory time which is based on a ratio of the memory bandwidth over the saturation point. Otherwise, if the memory bandwidth is less than the saturation point, the system assumes memory time is constant versus processor frequency. Then, the system uses the memory time and an estimate of the compute time to estimate a phase time for the target application at different processor frequencies.

20 Claims, 7 Drawing Sheets

(56) References Cited

OTHER PUBLICATIONS

Miftakhutdinov et al., "Predicting Performance Impact of DVFS for Realistic Memory Systems", Proceedings of the 2012 45th Annual IEEE/ACM International Symposium on Microarchitecture, Dec. 2012, pp. 155-165, IEEE Computer Society, Washington, DC, USA.

Eyerman et al., "A Counter Architecture for Online DVFS Profitability Estimation", IEEE Transactions on Computers, Nov. 2010, pp. 1576-1583, vol. 59, Issue 11, IEEE Computer Society.

Moseley et al., "Methods for Modeling Resource Contention on Simultaneous Multithreading Processors", Proceedings of the 2005 IEEE International Conference on Computer Design (ICCD'05), Oct. 2005, 8 pages, IEEE Computer Society.

\* cited by examiner

BANDWIDTH-AWARE MULTI-FREQUENCY PERFORMANCE ESTIMATION MECHANISM

BACKGROUND

Description of the Related Art

Processors (e.g., central processing units (CPUs)) can utilize dynamic voltage and frequency scaling (DVFS) to boost performance, decrease power consumption, and improve energy efficiency. DVFS allows the supply voltage and the clock frequency supplied to processors to be adjusted to meet application needs. For embedded devices, DVFS is used to achieve low energy consumption to increase the battery life of the device. For high-performance computing systems, the goal is often to maximize system performance within a given power budget.

Determining how to employ DVFS depends on many factors. One of the challenges of utilizing DVFS effectively is dynamically predicting the performance impact of frequency changes for arbitrary applications. This can be difficult because program execution time does not depend solely on core frequency. While some sections of a program will run faster at higher frequencies, others are limited by non-core components, such as dynamic random-access memory (DRAM) latency. Accordingly, simple linear scaling models, where performance is considered to be directly proportional to frequency, often yield inadequate results.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
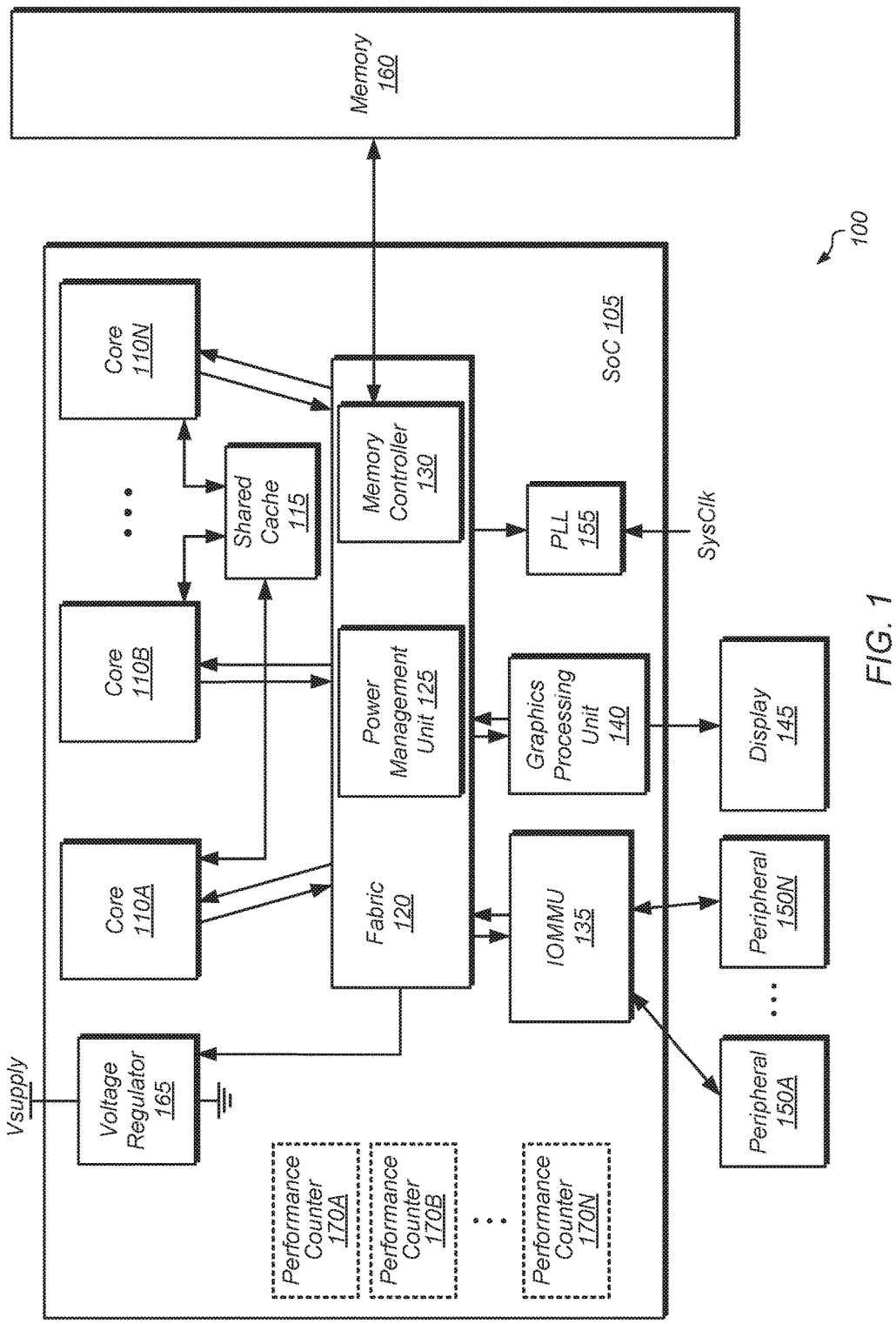
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a bandwidth-aware multi-frequency performance estimation mechanism are disclosed. In one embodiment, a system includes one or more processors and a memory subsystem. In one embodiment, the system implements dynamic voltage and frequency scaling (DVFS) to adjust the voltage and frequency provided to the one or more processors. In one embodiment, a user specifies a performance target for the system, and the system determines which voltage and frequency to supply to the one or more processors to meet the specified performance target. In one embodiment, the system determines a saturation point for the memory subsystem and then uses the saturation point when estimating the phase time for an application. For example, the system estimates the phase time for an application differently based on whether or not the memory bandwidth for the application is meets the saturation point (e.g., is greater than or equal to the saturation point).

In one embodiment, the saturation point of a memory subsystem is determined empirically by observing when the leading-load memory time starts to increase. In one embodiment, the leading-load memory time is calculated using the number of stall cycles due to memory access. In one embodiment, if a first memory time for a first frequency setting is a given amount more or less than a second memory time in a second frequency setting, wherein the second frequency setting is adjacent to the first frequency setting, then the bandwidth associated with the first memory time is considered the saturation point of the memory subsystem. Generally speaking, the saturation point is used to identify when the memory time will stop to be constant and start to increase with processor frequency in a particular architecture.

In one embodiment, the system executes a characterization phase to determine the saturation point for the memory subsystem. During the characterization phase, the system runs one or more memory-intensive applications on the one or more processors at multiple different operating points. Each operating point is associated with a given frequency, with different operating points employing different clock frequencies for the one or more processors. While the memory-intensive applications are executing on the one or more processors, the system monitors a plurality of performance counters to build up a database of samples. In one embodiment, the performance counters monitor unhalted cycles, stall cycles due to memory accesses, a number of memory bytes read, and a number of memory bytes written. In other embodiments, the performance counters can include other counters monitoring other parameters. The system determines the saturation point (i.e., critical memory bandwidth threshold) based on the collected data. In one embodiment, the saturation point is determined based on when the leading-load memory time starts to increase. For example, in one embodiment, if the memory time in one frequency is 20% more than the memory time in another frequency, then the bandwidth associated with that memory time is considered the saturation point.

In one embodiment, once the saturation point has been determined, a data sampling phase is implemented to capture samples of performance counters while executing a target application on the computing system. The system collects the values of performance counters over a given time interval, with the given time interval less than the phase of the application being optimized, and with the performance counter values being used as inputs to a predictor. The predictor is configured to generate performance projections for the computing system while executing the target application. After collecting the samples of the performance counters, the predictor estimates the core time and the memory time for a plurality of processor frequencies. The estimate of the memory time is based on a comparison of the memory bandwidth during the given time interval to the saturation point. If the memory bandwidth is less than the saturation point, then the predictor estimates that the memory time is equal to a constant value. However, if the memory bandwidth is greater than or equal to the saturation point, then the predictor estimates the memory time based on a ratio of the memory bandwidth to the saturation point.

In one embodiment, after accumulating a high enough number of samples, the predictor will have calculated the core time and memory time for multiple different processor frequencies. The sum of core time and memory time for a particular frequency is equal to the phase time for the application if the application were executed at the particular frequency. The system determines which phase time corresponds to a performance target provided by the user, and then the system provides an operating frequency to the processors which is predicted to have this phase time. This process starts again once a new phase of the application is initiated.

FIG. 1 is a block diagram of a computing system 100, in accordance with some embodiments. In these embodiments, computing system 100 includes system on chip (SoC) 105 coupled to memory 160. SoC 105 can also be referred to as an integrated circuit (IC). In some embodiments, SoC 105 includes a plurality of processor cores 110A-N. In other embodiments, SoC 105 includes a single processor core 110. In multi-core embodiments, processor cores 110A-N can be identical to each other (i.e., symmetrical multi-core), or one or more cores can be different from others (i.e., asymmetric multi-core). Processing cores 110A-N are representative of any number and type of processing units. In one embodiment, processing cores 110A-N are central processing unit (CPU) cores. In another embodiment, one or more of processing cores 110A-N are other types of processing units (e.g., application specific integrated circuit (ASIC), field programmable gate array (FPGA), digital signal processor (DSP)). Processing cores 110A-N are coupled to shared cache 115 and fabric 120.

In one embodiment, processing cores 110A-N are configured to execute instructions of a particular instruction set architecture (ISA). In one embodiment, the processing cores 110A-N are configured to execute the main control software of system 100, such as an operating system. Generally, software executed by processing cores 110A-N during use can control the other components of system 100 to realize the desired functionality of system 100. Processing cores 110A-N can also execute other software, such as application programs.

Each processor core 110 includes one or more execution units, cache memories, schedulers, branch prediction circuits, and so forth. Furthermore, each of processor cores 110 is configured to assert requests for access to memory 160, which functions as main memory for computing system 100. Such requests include read requests and/or write requests, and are initially received from a respective processor core 110 by fabric 120.

Input/output memory management unit (IOMMU) 135 is also coupled to fabric 120 in the embodiment shown. In one embodiment, IOMMU 135 functions as a south bridge device in computing system 100. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) can be coupled to IOMMU 135. Various types of peripheral devices 150A-N can be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices 150A-N that are coupled to IOMMU 135 via a corresponding peripheral bus are configured to assert memory access requests using direct memory access (DMA). These requests (which can include read and write requests) are conveyed to fabric 120 via IOMMU 135.

In some embodiments, SoC 105 includes a graphics processing unit (GPU) 140 that is coupled to display 145 of computing system 100. In some embodiments, GPU 140 is an integrated circuit that is separate and distinct from SoC 105. Display 145 can be a flat-panel LCD (liquid crystal display), plasma display, a light-emitting diode (LED) display, or any other suitable display type. GPU 140 performs various video processing functions and provides the processed information to display 145 for output as visual information. GPU 140 is also configured to perform other types of tasks scheduled to GPU 140 by an application scheduler. SoC 105 includes any number of cores 110A-N and compute units of GPU 140 for executing tasks of various applications or processes. The application or task scheduler (not shown) of SoC 105 is configured to schedule tasks to cores 110A-N and compute units of GPU 140.

In one embodiment, memory controller 130 is integrated into fabric 120. In other embodiments, memory controller 130 is separate from fabric 120. Memory controller 130 receives memory requests conveyed from fabric 120. Data accessed from memory 160 responsive to a read request is conveyed by memory controller 130 to the requesting agent via fabric 120. Responsive to a write request, memory controller 130 receives both the request and the data to be written from the requesting agent via fabric 120. If multiple memory access requests are pending at a given time, memory controller 130 arbitrates between these requests. In one embodiment, memory controller 130 includes one or more performance counters 170A-N for tracking the memory bandwidth. In one embodiment, memory controller 130 includes a first counter to monitor the amount of data (e.g., number of bytes) written to memory 160 and a second counter to monitor the amount of data read from memory 160.

In one embodiment, power management unit 125 is integrated into fabric 120. In other embodiments, power management unit 125 is separate from fabric 120 and/or power management unit 125 is implemented as multiple, separate components in multiple locations of SoC 105. Power management unit 125 is configured to manage the power states of the various processing units of SoC 105. In one embodiment, power management unit 125 employs dynamic voltage and frequency scaling (DVFS) to change the frequency and/or voltage of a processing unit.

In one embodiment, power management unit 125 sets the operating points of various processing units of SoC 105 so as to meet a desired performance level. In one embodiment, a user specifies a desired performance level for system 100. Then, power management unit 125 determines the operating point which will achieve the desired performance level. In one embodiment, power management unit 125 generates estimates of the phase time for an application running on system 100 at the different possible operating points. Power management unit 125 determines which estimate of phase time will achieve the desired performance level, and then power management unit 125 utilizes an operating point which corresponds to this estimate of phase time.

In one embodiment, the estimate of phase time is calculated as the sum of an estimate of compute time and an estimate of memory time for the application. In one embodiment, the estimate of memory time is calculated based on a comparison of the memory bandwidth to a saturation point of memory 160. The memory bandwidth is calculated during a period of time at the beginning of a given phase of the application executing on system 100. If the memory bandwidth is less than the saturation point, then the estimate of memory time is a fixed value. On the other hand, if the memory bandwidth is greater than or equal to the saturation point, then the estimate of memory time is calculated based on a ratio of the memory bandwidth to the saturation point.

SoC 105 includes multiple performance counters 170A-N, which are representative of any number of performance counters. It should be understood that while performance counters 170A-N are shown on the left-side of the block diagram of SoC 105, performance counters 170A-N can be spread throughout the SoC 105 and/or can be located within the components of SoC 105 in the actual implementation of SoC 105. In one embodiment, there are multiple performance counters 170A-N for each core 110A-N. In one embodiment, performance counters 170A-N include counters to monitor a number of unhalted cycles, a number of stall cycles due to memory accesses, a number of memory bytes read, and a number of memory bytes written.

In some embodiments, memory 160 includes a plurality of memory modules. Each of the memory modules includes one or more memory devices (e.g., memory chips) mounted thereon. In some embodiments, memory 160 includes one or more memory devices mounted on a motherboard or other carrier upon which SoC 105 may also be mounted. In some embodiments, at least a portion of memory 160 is implemented on the die of SoC 105 itself. Embodiments having a combination of the aforementioned embodiments are also possible and contemplated. In one embodiment, memory 160 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 160 includes (but is not limited to) double data rate (DDR) DRAM, DDR2 DRAM, DDR3 DRAM, and so forth. It is noted that memory 160 can also be referred to as a "memory subsystem".

Although not explicitly shown in FIG. 1, SoC 105 can also include one or more cache memories that are internal to the processor cores 110A-N and/or GPU 140. For example, each of the processor cores 110 can include an L1 data cache and an L1 instruction cache. In some embodiments, SoC 105 includes a shared cache 115 that is shared by the processor cores 110. In some embodiments, shared cache 115 is an L2 cache. In some embodiments, each of processor cores 110 has an L2 cache implemented therein, and thus shared cache 115 is an L3 cache. In one embodiment, cache 115 is part of a cache subsystem including a cache controller.

In the embodiment shown, SoC 105 includes a phase-locked loop (PLL) unit 155 coupled to receive a system clock signal. PLL unit 155 includes a number of PLLs configured to generate and distribute corresponding clock signals to each of processor cores 110 and to other components of SoC 105. In this embodiment, the clock signals received by each of processor cores 110 are independent of one another. Furthermore, PLL unit 155 in this embodiment is configured to individually control and alter the frequency of each of the clock signals provided to respective ones of processor cores 110 independently of one another. The frequency of the clock signal received by any given one of processor cores 110 is increased or decreased in accordance with power states assigned by power management unit 125. The various frequencies at which clock signals are output from PLL unit 155 correspond to different operating points for each of processor cores 110. Accordingly, a change of operating point for a particular one of processor cores 110 is put into effect by changing the frequency of its respectively received clock signal. In the case where changing the respective operating points of one or more processor cores 110 includes the changing of one or more respective clock frequencies, power management unit 125 changes the state of digital signals provided to PLL unit 155. Responsive to the change in these signals, PLL unit 155 changes the clock frequency of the affected processing node(s).

In the embodiment shown, SoC 105 also includes voltage regulator 165. In other embodiments, voltage regulator 165 can be implemented separately from SoC 105. Voltage regulator 165 provides a supply voltage to each of processor cores 110 and to other components of SoC 105. In some embodiments, voltage regulator 165 provides a supply voltage that is variable according to a particular operating point (e.g., increased for greater performance, decreased for greater power savings). In some embodiments, each of processor cores 110 shares a voltage plane. Thus, each processing core 110 in such an embodiment operates at the same voltage as the other ones of processor cores 110. In another embodiment, voltage planes are not shared, and thus the supply voltage received by each processing core 110 is set and adjusted independently of the respective supply voltages received by other ones of processor cores 110. Thus, operating point adjustments that include adjustments of a supply voltage are selectively applied to each processing core 110 independently of the others in embodiments having non-shared voltage planes. In the case where changing the operating point includes changing an operating voltage for one or more processor cores 110, power management unit 125 changes the state of digital signals provided to voltage regulator 165. Responsive to the change in the signals, voltage regulator 165 adjusts the supply voltage provided to the affected ones of processor cores 110. In instances when power is to be removed from (i.e., gated) one of processor cores 110, power management unit 125 sets the state of corresponding ones of the signals to cause voltage regulator 165 to provide no power to the affected processing core 110.

In various embodiments, computing system 100 can be a computer, laptop, mobile device, server, web server, cloud computing server, storage system, or other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include many other components not shown in FIG. 1. Additionally, in other embodiments, computing system 100 and/or SoC 105 can be structured in other ways than shown in FIG. 1.

Figure 2:
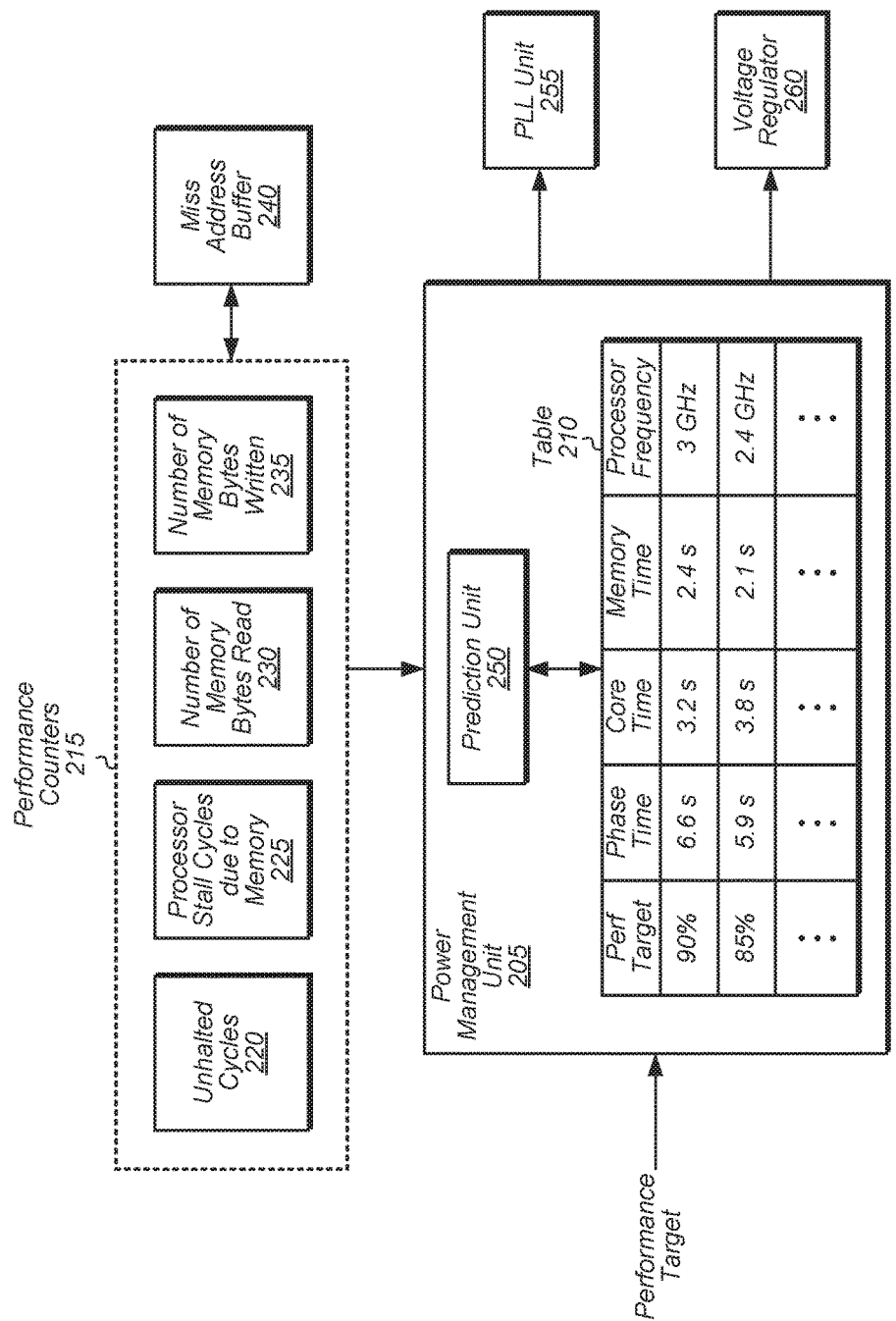
FIG. 2 is a block diagram of one embodiment of a power management unit.

Turning now to FIG. 2, a block diagram of one embodiment of a power management unit 205 is shown. In one embodiment, the components of power management unit 205 are implemented within power management unit 125 of computing system 100 (of FIG. 1). In one embodiment, power management unit 205 is configured to adjust the frequency and voltage provided to the processors of a computing system (e.g., computing system 100) to meet a given performance target. In one embodiment, a user specifies a performance target for the computing system. In another embodiment, power management unit 205 tracks the optimal energy efficient operating point of the host computing system. In other embodiments, other mechanisms for generating a performance target are possible and are contemplated.

In one embodiment, power management unit 205 includes prediction unit 250 and table 210. Prediction unit 250 is implemented using any suitable combination of control logic and/or software. In one embodiment, table 210 includes entries that specify a performance target, phase time, core time, and memory time for a corresponding processor frequency. In other embodiments, each entry of table 210 can omit one or more of these fields and/or include one or more other fields. Phase time is the sum of core time and memory time for the corresponding processor frequency. Prediction unit 250 is configured to convert the phase time to a corresponding performance target. In one embodiment, prediction unit 250 bases the conversion of phase time to performance target based on the phase time that was calculated when the host system executed an application at the highest operating point (i.e., maximum processor frequency). Prediction unit 250 then divides the phase time corresponding to the highest operating point by a given performance target to calculate the phase time which matches the given performance target. In one embodiment, power management unit 205 generates the data to populate table 210 during a sampling phase of an application based on the values of performance counters 215 and miss address buffer 240. In one embodiment, performance counters 215 include counters for monitoring unhalted cycles 220, processor stall cycles due to memory 225, a number of memory bytes read 230, and a number of memory bytes written 235.

In one embodiment, miss address buffer 240 is a structure that tracks outstanding cache misses. Misses are assigned to entries in miss address buffer 240 based on a fixed priority. Accordingly, a miss that occurs when the highest priority entry in miss address buffer 240 is available will be assigned to the highest priority entry. The first miss will be assigned to the highest priority entry in miss address buffer 240, as will the next miss after the first miss returns. Thus, the amount of time that the highest priority entry in miss address buffer 240 can be used as a proxy for the aggregate latency of all of the leading loads. In one embodiment, the occupancy time of the highest priority entry in miss address buffer 240 is measured in clock cycles using processor stall cycles due to memory counter 225.

Once power management unit 205 has populated the entries of table 210 during the sampling phase, prediction unit 250 utilizes the values in table 210 to determine which processor frequency to utilize based on the received performance target. In one embodiment, prediction unit 250 uses the received performance target to select a row of table 210, and then prediction unit 250 utilizes the frequency from the selected row to determine how to program PLL unit 255 to provide the operating frequency to the processor(s). Prediction unit 250 also sets voltage regulator 260 to a voltage which matches the selected frequency.

In one embodiment, the system (e.g., system of 100 FIG. 1) measures the number of unhalted cycles, $C_u$, and the number of cycles due to processor stalls related to main memory access, $C_m$ (e.g., DRAM, High Bandwidth Memory, etc.). In one embodiment, the number of cycles that are not stalling due to memory, $C_c$, is calculated as shown in Equation 1:

$$C_c = C_u - C_m \qquad (1)$$

It is assumed for the purposes of this discussion that a data collection phase takes T seconds when running at frequency f. The time that the processor spends waiting for memory is defined as $T_{m,f}$ and the time that the processor spends not waiting for memory is defined as $T_{c,f}$ when running at frequency f. In one embodiment, $T_{m,f}$ and $T_{c,f}$ are calculated as follows:

$$T_{c,f} = \frac{C_c}{f} \qquad (2)$$

$$T_{m,f} = \frac{C_m}{f} \qquad (3)$$

In some embodiments, leading-load-based models heuristically assume that $T_{m,f}$ is constant for every core frequency and that $T_{c,f}$ is directly proportional to the core frequency change ratio as described in Equation 4 below. According to the leading-load-based models, formula 4 shows how to estimate a phase time T if the CPU was running in another frequency, f':

$$T_{f'} = T_{c,f} \cdot \frac{f'}{f} + T_{m,f} \qquad (4)$$

These leading-load-based models assume that the time due to memory stalls is constant for all frequencies. However in practice, the time spent waiting on memory stalls is not constant if the workload is limited by the memory bandwidth. In situations where the memory bandwidth is not a limiting factor, the number of memory accesses per second will increase if the processor frequency increases as the processor will be faster and will be able to issue memory requests faster. In cases where the memory bandwidth is a limiting factor, the number of memory accesses per second will not increase as the memory bandwidth is saturated. Therefore, the memory time will not be constant.

In one embodiment, the system is configured to take into account whether the memory bandwidth is a limiting factor. The point at which memory bandwidth starts to become a limiting factor on the amount of time the processor spends waiting on memory is referred to herein as the "saturation point" or the "critical memory bandwidth threshold". Accordingly, after collecting a sample, the system estimates the core time, $T_{c,f}$, and the memory time, $T_{m,f}$, for each processor frequency f'. The new model uses a combination of leading-load prediction or memory bandwidth saturation. Equations 5 and 6 describe how the core time and memory time are calculated, where f is the frequency when the sample is collected, Bw is the sample bandwidth at frequency f, and C is the critical memory bandwidth threshold.

$$T_{c,f'} = T_{c,f} * \frac{f'}{f} \quad (5)$$

$$T_{m,f'} = \begin{cases} T_{m,f}, & \text{if } Bw < C \\ \frac{Bw}{C} * (T_{c,f} + T_{m,f}) - T_{c,f'}, & \text{if } Bw \geq C \end{cases} \quad (6)$$

Figure 3:
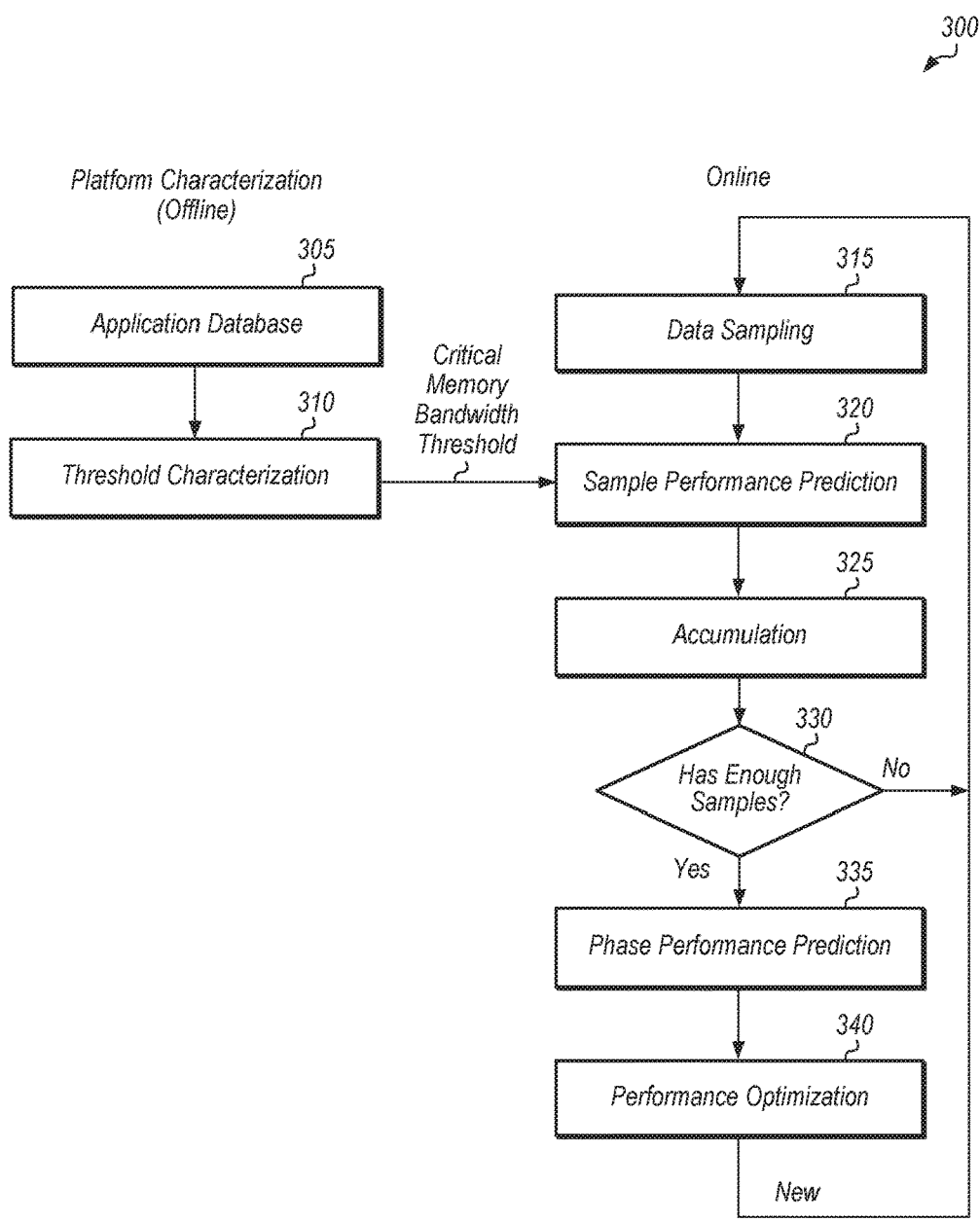
FIG. 3 is a generalized flow diagram illustrating one embodiment of a method for implementing a bandwidth-aware multi-frequency performance estimation mechanism.

Referring now to FIG. 3, one embodiment of a method 300 for implementing a bandwidth-aware multi-frequency performance estimation mechanism is shown. For purposes of discussion, the steps in this embodiment and those of FIGS. 4-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

In one embodiment, a computing system performs an offline platform characterization phase of method 300 as shown in blocks 305 and 310. In this platform characterization phase, a memory bound set of workloads (e.g., using the STREAM benchmark or some other benchmark) are run at different frequencies to build up an application database 305. These runs collect the leading-load model performance counters (e.g., unhalted cycles, stall cycles due to memory accesses) and the number of memory read/write accesses. Then, in block 310, a threshold characterization phase is implemented to determine the critical memory bandwidth threshold. In one embodiment, the critical memory bandwidth threshold is calculated by combining the memory read bandwidth and the memory write bandwidth. In various embodiments, there are two critical thresholds: a first threshold for the memory read bandwidth and a second threshold for the memory write bandwidth. These thresholds are determined empirically during the threshold characterization phase by observing when the leading-load memory time starts to increase.

In one embodiment, the leading-load memory time is calculated using the number of stall cycles due to a leading memory access. In one embodiment, if the memory time for a first processor frequency is a certain percentage (e.g., 20%) more (or less) than the memory time for a second processor frequency, then the memory bandwidth associated with the memory time for the first processor frequency is considered the critical memory bandwidth threshold. The critical memory bandwidth threshold is used to identify when the memory time will stop to be constant and start to increase with processor frequency in a particular architecture. It is noted that the critical memory bandwidth threshold can also be referred to as the "saturation point" herein.

The flowchart on the right-side of FIG. 3 illustrates the online phase of method 300 which can be performed after the offline platform characterization phase of method 300. During the data sampling block 315, the computing system collects performance counters for a given sampling period. The given sampling period is typically shorter by at least an order of magnitude than the phase of the application being optimized. For example, in one embodiment, the phase is 5 seconds and the sampling period is 10 milliseconds (ms). In other embodiments, other phase durations and sampling period durations can be utilized. During data sampling block 315, performance counters are collected to be used by the predictor for generating performance projections. In one embodiment, the performance counters are utilized to capture the number of unhalted cycles, the number of processor stall cycles caused by pending memory requests, the amount of memory bytes read, and the amount of memory bytes written. In other embodiments, other performance counters can be utilized. In one embodiment, the number of processor stall cycles due to memory is equal to the sum of the processor stall cycles due to a last level cache miss and the processor stall cycles due to a full store buffer in an out-of-order architecture. In another embodiment, the number of processor stall cycles due to memory is equal to the number of cycles stalled in the memory address buffer. In other embodiments, any of various other types of performance counters can be used as a proxy for representing the number of processor stall cycles due to memory.

After collecting samples, the system begins the sample performance prediction block 320. In this phase, the system estimates the core time, $T_{c,f'}$, and the memory time, $T_{m,f'}$, for each processor frequency f'. Equation 5 and Equation 6, shown above, describe how the core time, $T_{c,f'}$, and the memory time, $T_{m,f'}$, are calculated, where f is the frequency that the sample is collected, Bw is the sample bandwidth at frequency f, and C is the critical memory bandwidth threshold.

During the accumulation block 325, the system accumulates the predicted memory time and core time for each possible operating frequency f'. If the system determines enough samples have been accumulated (conditional block 330, "yes" leg), then the system transitions to the phase performance prediction block 335. In one embodiment, the system determines enough samples have been accumulated if the system is able to predict a memory time and core time for each possible operating frequency. The number of samples which are used to predict a memory time and a core time for each possible operating frequency can vary from embodiment to embodiment. If the system determines not enough samples have been accumulated (conditional block 330, "no" leg), then the system returns to the data sampling block 315.

In the phase performance prediction block 335, the system will have generated an estimate for the core time and the memory time for each possible operating frequency. The system calculates the sum of core time and memory time for a given frequency. The system uses the sum of core time and memory time as a prediction of the phase time for an application when the processor is operating at the given frequency.

Next, the system moves to the performance optimization block 340. During the performance optimization block 340, the system determines which predicted phase time will meet a specified performance target, and then the system sets the operating frequency of the processor to a frequency which is predicted to produce this phase time. The online process starts again once a new phase starts, with method 300 returning to data sampling block 315.

It is noted that method 300 can be performed as a single method or performed as two separate methods, depending on the embodiment. If method 300 is performed as two separate methods, the left-side of FIG. 3 (blocks 305-310) is performed as a first method and the right-side of FIG. 3 (blocks 315-340) is performed as a second method.

Figure 4:
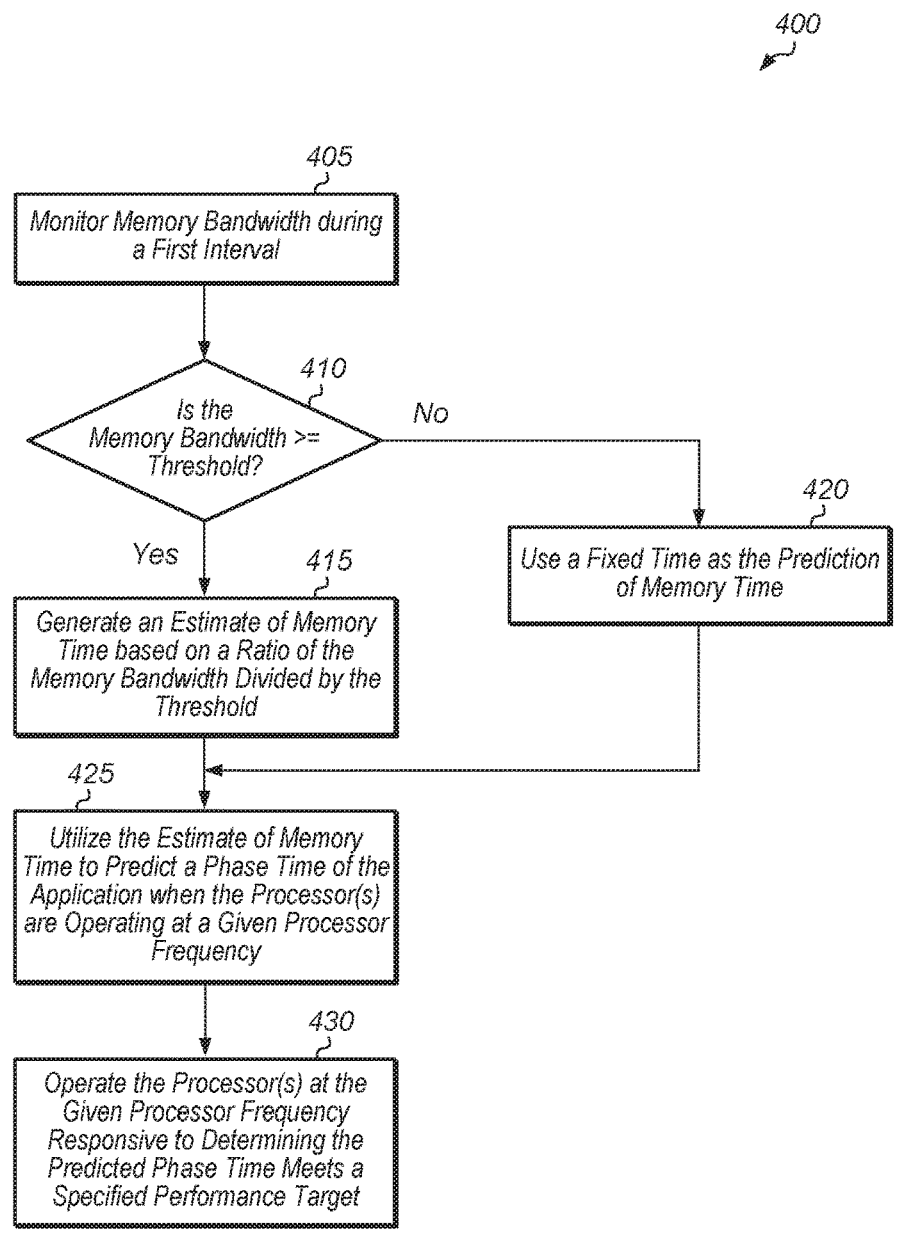
FIG. 4 is a generalized flow diagram illustrating one embodiment of a method for generating an estimate of memory time for an application.

Turning now to FIG. 4, one embodiment of a method 400 for generating an estimate of memory time for an application is shown. A system monitors memory bandwidth during a first interval (block 405). In one embodiment, the system includes one or more processors and a memory subsystem. In one embodiment, the one or more processors operate in a first clock domain while the memory subsystem operates in a second clock domain. In one embodiment, the system monitors the read memory bandwidth and the write memory bandwidth during the first interval. In another embodiment, the system monitors the total memory bandwidth without tracking the read memory bandwidth separately from the write memory bandwidth.

Next, the system determines if memory bandwidth during the first interval is greater than or equal to a threshold (conditional block 410). In one embodiment, the threshold is a saturation point of the memory subsystem. In one embodiment, the system implements a characterization phase to determine the saturation point of the memory subsystem. In another embodiment, the threshold is specified by a user. In other embodiments, the threshold can be determined in other manners. If memory bandwidth during the first interval is greater than or equal to the threshold (conditional block 410, "yes" leg), then the system generates an estimate of memory time based on a ratio of the memory bandwidth divided by the threshold (block 415). In one embodiment, the memory time is defined as the amount of time the one or more processors will spend waiting on requests from the memory subsystem. If memory bandwidth during the first interval is less than or equal to a threshold (conditional block 410, "no" leg), then the system uses a fixed time as the estimate of memory time (block 420). In other words, the system assumes the memory time is fixed versus frequency in block 420.

It is noted that in another embodiment, the read memory bandwidth can be compared to a first threshold and the write memory bandwidth can be compared to a second threshold in conditional block 410. If either bandwidth is greater than or equal to the corresponding threshold, then the "yes" leg of conditional block 410 can be followed. If both bandwidths are less than their corresponding thresholds, then the "no" leg of conditional block 410 can be followed.

After blocks 415 and 420, the system utilizes the estimate of memory time to predict a phase time of the application when the processor(s) are operating at a given processor frequency (block 425). In one embodiment, the phase time is calculated as the sum of the estimate of memory time and an estimate of compute time. In one embodiment, the estimate of compute time is calculated according to equation 5 as previously described. After block 425, the system operates the processor(s) at the given processor frequency responsive to determining the predicted phase time meets a specified performance target (block 430). In one embodiment, the performance target is specified by a user. After block 430, method 400 ends.

Figure 5:
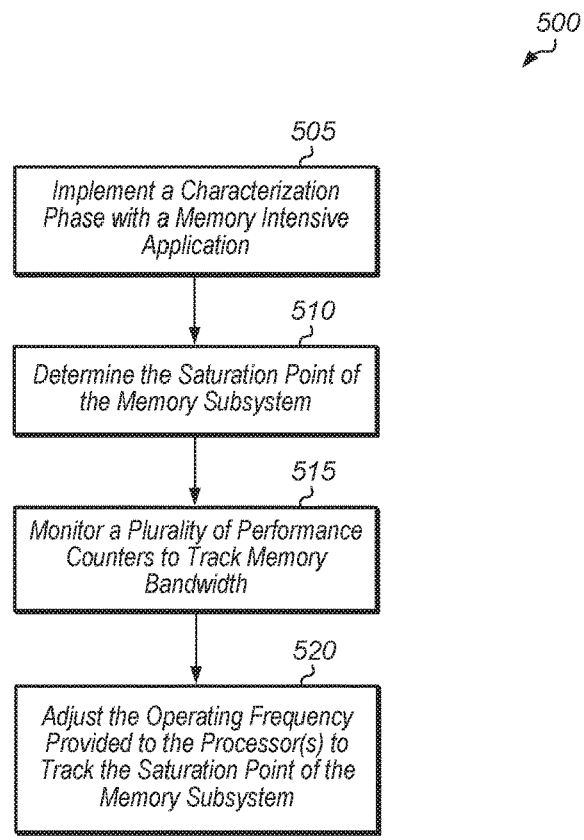
FIG. 5 is a generalized flow diagram illustrating one embodiment of a method for executing an application on a computing system at an optimal energy efficient operating point.

Referring now to FIG. 5, one embodiment of a method 500 for executing an application on a computing system at an optimal energy efficient operating point is shown. A computing system implements a characterization phase with a memory intensive application (block 505). It is assumed for the purposes of this discussion that the system includes at least one or more processors and a memory subsystem. The characterization phase is implemented with the memory intensive application so as to build a database of values which are then used to characterize the computing system.

During the characterization phase, the system determines the saturation point of the memory subsystem (block 510). The saturation point is defined as the memory bandwidth threshold at which the memory time will start to increase as the processor frequency increases. In one embodiment, the saturation point is determined empirically by observing when the leading-load memory time starts to increase. In one embodiment, the leading-load memory time is calculated using the number of stall cycles caused by a memory access.

In one embodiment, if the memory time in one frequency is 20% more (or less) than the memory time in the adjacent frequency setting, the bandwidth associated with that time is considered the saturation point. Next, during the execution of a target application, the system monitors a plurality of performance counters to track memory bandwidth (block 515). Then, based on the values of the performance counters, the system adjusts the operating frequency provided to the processor(s) to track the saturation point of the memory subsystem (block 520). For example, if the values of the performance counters indicate the memory bandwidth is below the saturation point, then the system increases the operating frequency. If the values of the performance counters indicate the memory bandwidth is above the saturation point, then the system decreases the operating frequency. If the values of the performance counters indicate the memory bandwidth is within a threshold amount of the saturation point, then the system maintains the current operating frequency. After block 520, method 500 ends.

Figure 6:
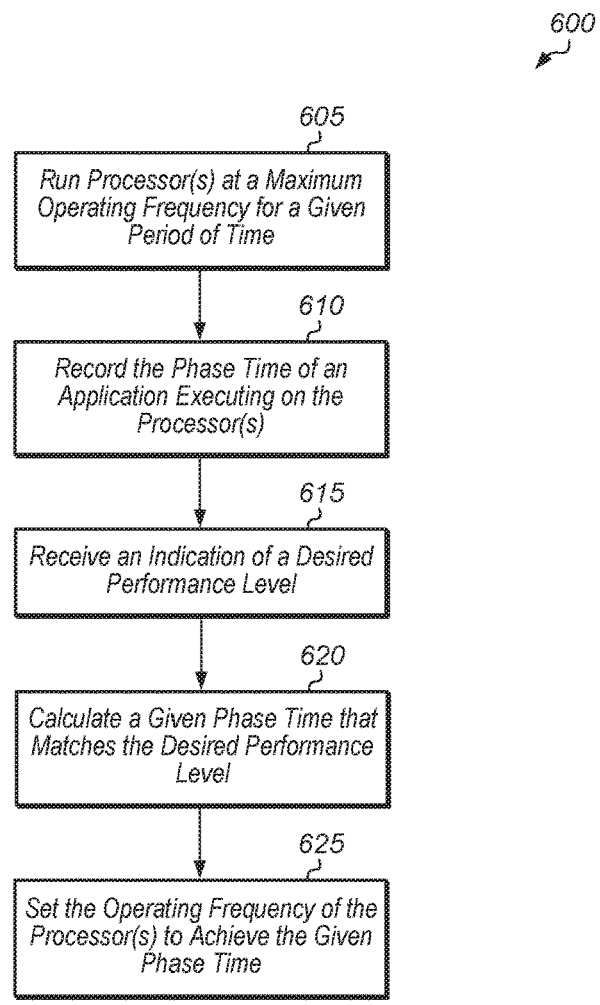
FIG. 6 is a generalized flow diagram illustrating one embodiment of a method for operating a computing system at a specified performance level.

Turning now to FIG. 6, one embodiment of a method 600 for operating a computing system at a specified performance level is shown. A computing system runs one or more processors at a maximum frequency for a given period of time (block 605). While running the one or more processors at the maximum possible frequency, the computing system records the phase time of an application executing on the processor(s) (block 610). Then, the computing system receives an indication of a desired performance level (block 615). In one embodiment, the desired performance level is specified by a user. Then, the system calculates a given phase time that matches the desired performance level (block 620). In one embodiment, the given phase time is calculated by taking the phase time at the maximum frequency and multiplying this phase time by one divided by the desired performance level. Next, the system sets the operating frequency of the processor(s) to achieve the given phase time (block 625). After block 625, method 600 ends.

Figure 7:
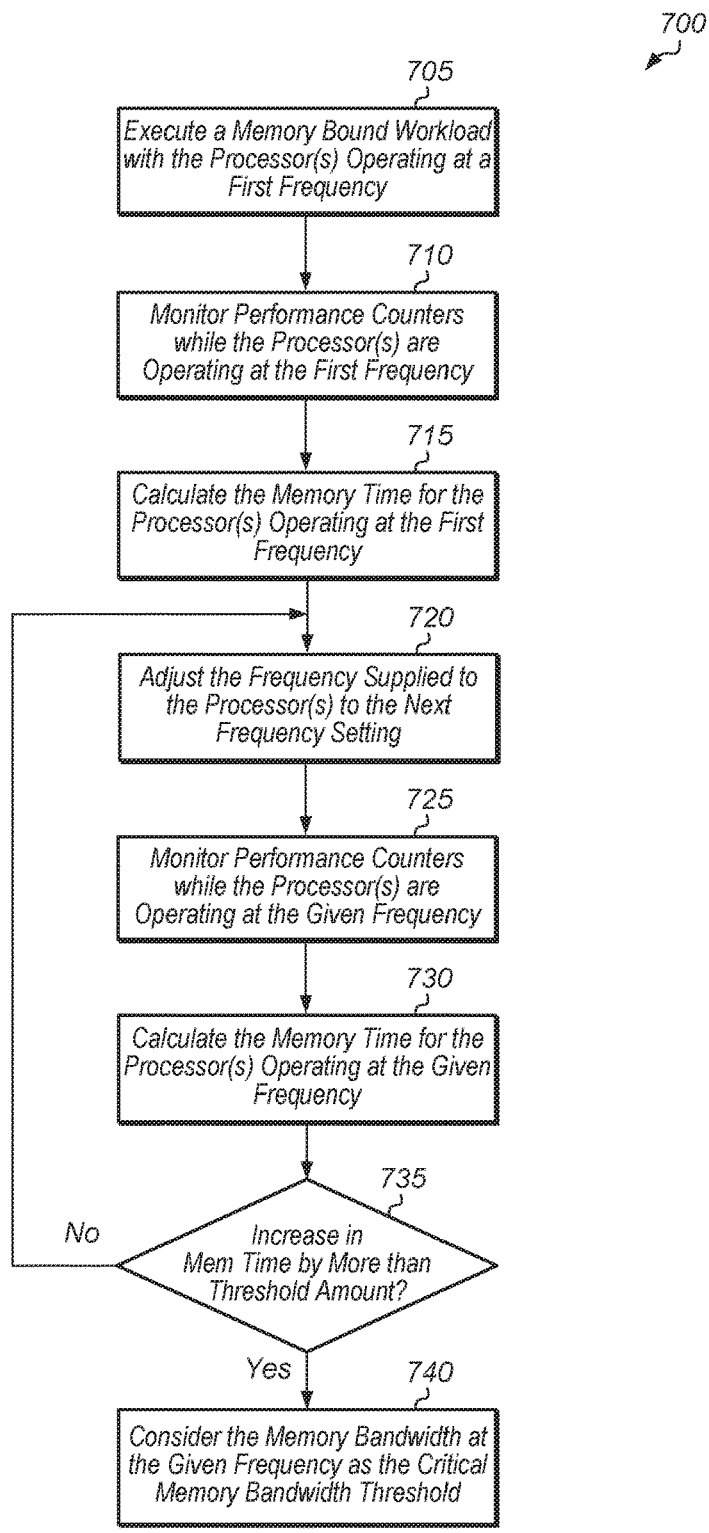
FIG. 7 is a generalized flow diagram illustrating one embodiment of a method for determining a critical bandwidth threshold.

Referring now to FIG. 7, one embodiment of a method 700 for determining a critical bandwidth threshold is shown. A computing system executes a memory bound workload with the processor(s) operating at a first frequency (block 705). The computing system monitors performance counters while the processor(s) are operating at the first frequency (block 710). In one embodiment, the performance counters include unhalted cycles, stall cycles due to memory accesses, the number of memory bytes read from memory, and the number of memory bytes written to memory. The computing system calculates the memory time for the processor(s) operating at the first frequency (block 715). The memory time is calculated based on the values of the performance counters while the processor(s) are operating at the first frequency.

Then, the computing system adjusts the frequency supplied to the processor(s) to the next frequency setting while continuing to execute a memory bound workload (block 720). The incremented frequency corresponds to the next frequency setting for the next operating point of the processor(s). If the processor is already at the maximum frequency, then the frequency supplied to the processor(s) can be changed to the lowest possible frequency, or the frequency can be decremented to one frequency setting below the maximum frequency.

The computing system monitors the leading-load model performance counters for the given frequency (block 725). Then, the computing system calculates the memory time for the processor(s) operating at the given frequency (block 730). If the memory time for the processor(s) operating at the given frequency is greater than the memory time of the processor(s) operating at the previous frequency by more than a threshold amount (conditional block 735, "yes" leg), then the memory bandwidth of the system operating at the given frequency is considered the critical memory bandwidth threshold for the system (block 740). In one embodiment, the threshold amount is 20%. In other embodiments, the threshold amount can be any of various other values. After block 740, method 700 ends. If the memory time for the processor(s) operating at the given frequency is not greater than the memory time of the processor(s) operating at the previous frequency by more than the threshold amount (conditional block 735, "no" leg), then method 700 returns to block 720 with the system adjusting the frequency supplied to the processor(s) to the next frequency setting.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a memory subsystem; and
   one or more processors;
   wherein the system is configured to:
      determine if memory bandwidth of the memory subsystem during a first interval is greater than or equal to a threshold;
      generate, based on a ratio of the memory bandwidth divided by the threshold, a first estimate of memory time for the one or more processors responsive to determining the memory bandwidth of the memory subsystem during the first interval is greater than or equal to the threshold; and
      use a second estimate of memory time based on a value other than the ratio of the memory bandwidth divided by the threshold, responsive to determining the memory bandwidth during the first interval is not greater than or equal to the threshold.

2. The system as recited in claim 1, wherein the system is further configured to:
   predict a phase time of the one or more processors at a given processor frequency based on the first estimate of memory time; and
   operate the one or more processors at the given processor frequency responsive to determining the phase time meets a specified performance target.

3. The system as recited in claim 2, wherein the memory time is an amount of time the one or more processors spend waiting on memory requests to be processed by the memory subsystem.

4. The system as recited in claim 2, wherein the memory bandwidth is calculated during the first interval while the one or more processors are operating at a first frequency, wherein the given processor frequency is a second frequency, and wherein the second frequency is different from the first frequency.

5. The system as recited in claim 1, wherein the system is configured to use a fixed time as the second estimate of memory time responsive to determining the memory bandwidth during the first interval is not greater than or equal to the threshold.

6. The system as recited in claim 2, wherein the performance target is specified by a user, and wherein the performance target is specified as a percentage of maximum performance.

7. The system as recited in claim 2, wherein a frequency provided to the memory subsystem is independent of a frequency provided to the one or more processors, and wherein the threshold is set based on a point at which bandwidth saturates for the memory subsystem.

8. A method comprising:
   determining if memory bandwidth of a memory subsystem during a first interval is greater than or equal to a threshold;
   generating, based on a ratio of the memory bandwidth divided by the threshold, a first estimate of memory time responsive to determining the memory bandwidth during the first interval is greater than or equal to the threshold; and
   using a second estimate of memory time based on a value other than the ratio of the memory bandwidth divided by the threshold, responsive to determining the memory bandwidth during the first interval is not greater than or equal to the threshold.

9. The method as recited in claim 8, further comprising:
   predicting a phase time of one or more processors at a given processor frequency based on the first estimate of memory time; and
   operating the one or more processors at the given processor frequency responsive to determining the phase time meets a specified performance target.

10. The method as recited in claim 9, wherein the memory time is an amount of time the one or more processors spend waiting on memory requests to be processed by the memory subsystem.

11. The method as recited in claim 9, wherein the performance target is specified by a user, and wherein the performance target is specified as a percentage of maximum performance.

12. The method as recited in claim 9, wherein a frequency provided to a memory subsystem is independent of a frequency provided to the one or more processors, and wherein the threshold is set based on a point at which bandwidth saturates for the memory subsystem.

13. The method as recited in claim 8, wherein the memory bandwidth is calculated during the first interval while the one or more processors are operating at a first frequency, wherein the given processor frequency is a second frequency, and wherein the second frequency is different from the first frequency.

14. The method as recited in claim 8, comprising using a fixed time as the second estimate of memory time responsive to determining the memory bandwidth during the first interval is not greater than or equal to the threshold.

15. A processor comprising:
   one or more execution units; and
   a power management unit;

wherein the processor is configured to:
    determine if memory bandwidth of a memory subsystem during a first interval is greater than or equal to a threshold; and
    generate, based on a ratio of the memory bandwidth divided by the threshold, a first estimate of memory time responsive to determining the memory bandwidth during the first interval is greater than or equal to the threshold; and
    use a second estimate of memory time based on a value other than the ratio of the memory bandwidth divided by the threshold, responsive to determining the memory bandwidth during the first interval is not greater than or equal to the threshold.

16. The processor as recited in claim 15, wherein the processor is further configured to:
    predict a phase time of the processor at a given processor frequency based on the first estimate of memory time; and
    operate at the given processor frequency responsive to determining the phase time meets a specified performance target.

17. The processor as recited in claim 16, wherein the memory time is an amount of time spent waiting on memory requests to be processed by the memory subsystem.

18. The processor as recited in claim 16, wherein the performance target is specified by a user, and wherein the performance target is specified as a percentage of maximum performance.

19. The processor as recited in claim 15, wherein the memory bandwidth is calculated during the first interval while the processor is operating at a first frequency, wherein the given processor frequency is a second frequency, and wherein the second frequency is different from the first frequency.

20. The processor as recited in claim 15, wherein the processor is configured to use a fixed time as the second estimate of memory time responsive to determining the memory bandwidth during the first interval is not greater than or equal to the threshold.

* * * * *